Aug. 26, 1924.  
C. N. SOWDEN  
DEMOUNTABLE RIM  
Filed Jan. 23, 1922  
1,506,682
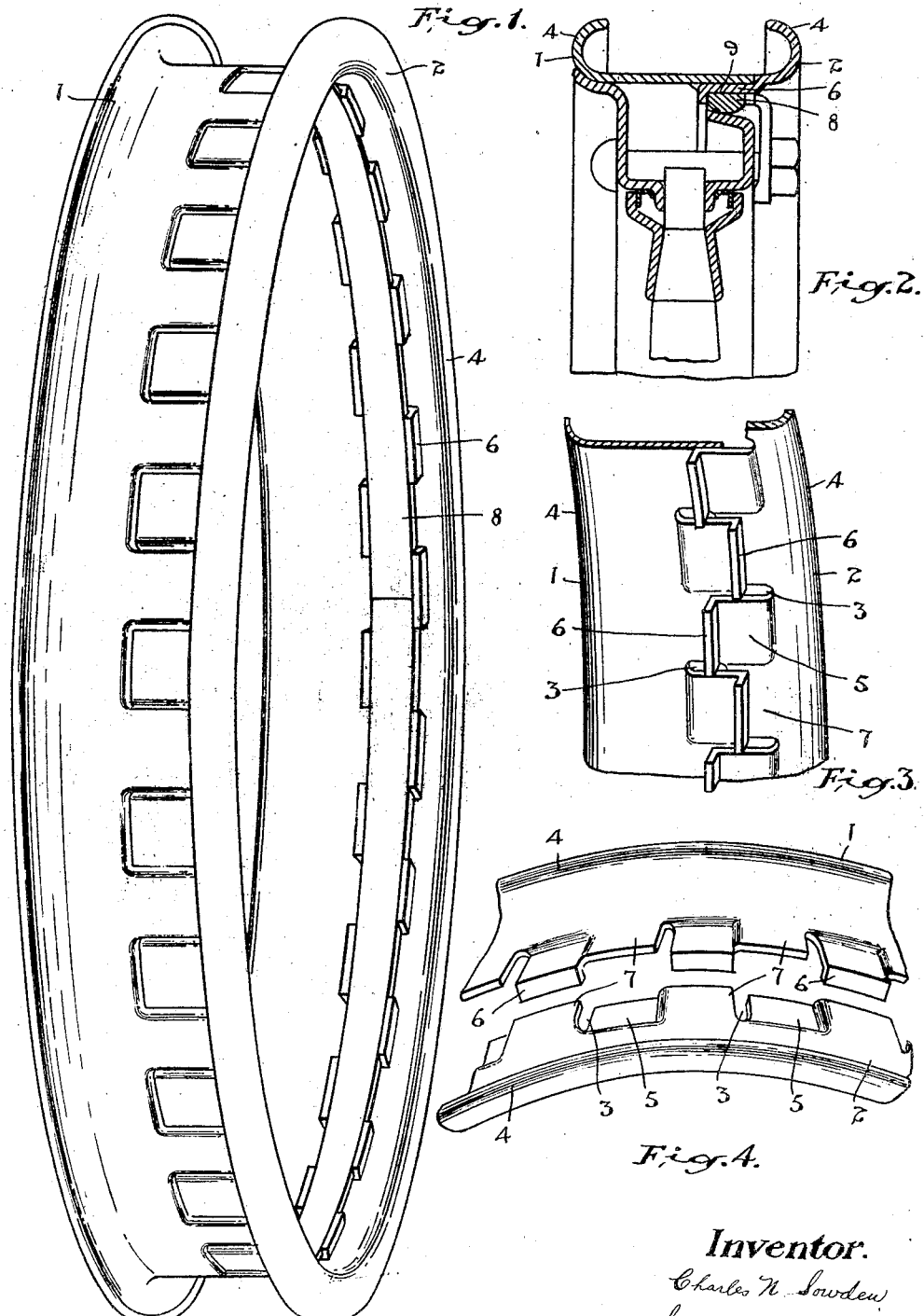
Inventor.  
Charles N. Sowden Patented Aug. 26, 1924.

1,506,682

UNITED STATES PATENT OFFICE.

CHARLES NEVILLE SOWDEN, OF TORONTO, ONTARIO, CANADA.

DEMOUNTABLE RIM.

Application filed January 23, 1922. Serial No. 531,193.

*To all whom it may concern:*

Be it known that I, CHARLES NEVILLE SOWDEN, a subject of the King of Great Britain, and resident of the city of Toronto, county of York, Province of Ontario, in the Dominion of Canada, have invented certain new and useful Improvements in Demountable Rims, described in the following specification and illustrated in the accompanying drawings, that form part of the same.

The principal object of the invention are, to facilitate the removal and replacement of pneumatic tires and to provide a rim which will separate laterally from each side of the tire and which when the sections are together will be of a positive structure and strong and durable.

The principal feature of the invention consists in the novel formation of a pair of annular rim sections whereby the inward edges are formed with inter-nesting lug members which are locked in their inward position by a spring ring engaging inwardly turned flanges on the lugs.

In the drawings, Figure 1 is a perspective view of my improved rim.

Figure 2 is a cross sectional view through the rim and supporting felloe of the wheel.

Figure 3 is a perspective detail of a portion of the rim from the inner side showing the rings being separated.

Figure 4 is a perspective view from the outer side of the two portions of the rim taken apart.

The rim is formed of two sections 1 and 2, each of which is the complement of the other having the inward edges formed with slots 3 extending toward the outer bead 4. The metal between the slots is formed half the width into depressions 5, the metal being pressed inwardly from the outer face in substantially rectangular shape and each depressed portion having an inwardly turned edge flange 6. The remaining substantially rectangular portion 7 of each of the portions between the slots is flush with the circumferential surface of the section, consequently the flush portion of each section will fit into the depressed portion of the other and the web of metal connecting the two portions extends through the slots.

With this construction the lugs 6 are arranged in series in two rows and these are spaced apart a definite distance regulated by the depth of the slots 3, the web of the metal of the members 5 and 7 abutting the bottoms of the slots.

When the sections are thus placed together a spring ring 8 of a strip of metal is inserted, consequently interlocking with the lugs to prevent the sections of the rim from spreading apart. The spring ring forms a lock for holding the two sections of the rim together and is very simple both in its application and removal.

In placing the ring after the rim sections are in place one end is inserted between the rows of lugs and the remainder is sprung into place. It will not become disengaged accidentally but when it is desired to remove the tire one end of the ring is sprung inwardly to clear the lugs and the remainder then comes away readily. When the ring is removed the two sections of the rim may be very easily and quickly separated without requiring any special form of tools such as are required for the present forms of transversely split rings which have to be drawn inwardly the full depth of the flange to clear the beads of the tire.

The advantages of the rim herein shown and described will be readily apparent and it will be possible to remove and replace tires very quickly and without injury to either the tire or the rim.

The rim is shown as having the interlocking lugs offset to one side and the spring ring 8 is formed with a rounded cross section to fit the bevelled surface 9 of the portion of the rim between the outer flanges but the lugs may be arranged in the centre if desired.

It will be noted that each of the rim sections are formed of uniform thickness of metal, the whole being formed up without having any added or upset portions. This keeps the cost of construction to the minimum and renders the device very simple to make.

What I claim as my invention is:—

1. A demountable rim, comprising a pair of flanged rings having their meeting edges formed with narrow slots spaced at regular intervals a greater distance apart than their width, the metal between the slots having a part thereof depressed forming uniform spaced circumferential depressions, and the portions between the depressed and raised portions of one ring entering the slots in the other ring.

2. A demountable rim, comprising a pair of flanged rings having narrow slots regularly spaced apart and opening from the adjacent edges of said rings, the metal between the said rings being depressed for one-half their width, the depressed portions having an outturned radial flange, said rings being internested, and a locking ring being inserted between the circumferential rows of inturned flanges.

CHARLES NEVILLE SOWDEN.